United States Patent [19]

Niday

[11] 4,103,556
[45] Aug. 1, 1978

[54] MECHANICAL MOVEMENT MECHANISM
[75] Inventor: Louis L. Niday, 2816-42nd, Des Moines, Iowa 50310
[73] Assignee: Louis L. Niday, Des Moines, Iowa
[21] Appl. No.: 685,656
[22] Filed: May 12, 1976
[51] Int. Cl.² ............................................. F16H 21/16
[52] U.S. Cl. .......................................... 74/25; 74/60; 74/99 A; 56/296
[58] Field of Search ...................... 74/60, 25, 55, 99 A, 74/99 R; 56/296

[56] References Cited
U.S. PATENT DOCUMENTS

| | | | |
|---|---|---|---|
| 2,835,133 | 5/1958 | Rogers et al. | 74/60 |
| 3,006,324 | 10/1961 | Shaw | 74/60 |
| 3,104,511 | 9/1963 | Clark | 74/60 |
| 3,112,652 | 12/1963 | Freeborn | 56/296 |
| 3,359,809 | 12/1967 | Spender | 74/55 |
| 3,444,676 | 5/1969 | Hale et al. | 74/60 |
| 3,968,699 | 7/1969 | Beukering | 74/60 |
| 4,023,333 | 5/1977 | Anderson | 74/60 |

FOREIGN PATENT DOCUMENTS 687,895   6/1930   France ........................................ 74/60

Primary Examiner—C. J. Husar
Attorney, Agent, or Firm—Henderson, Strom, Sturm, Cepican & Fix

[57] ABSTRACT

This invention is a reversible mechanical movement. A bearing arm is rigidly connected to an oscillatory shaft. A contact disc is rigidly attached to a rotatable shaft. The bearing arm and the contact disc contact one another to convert rotary motion to oscillating motion, or the reverse. The conversion of oscillating motion to linear reciprocating motion, or the reverse, is accomplished by conventional methods.

12 Claims, 14 Drawing Figures

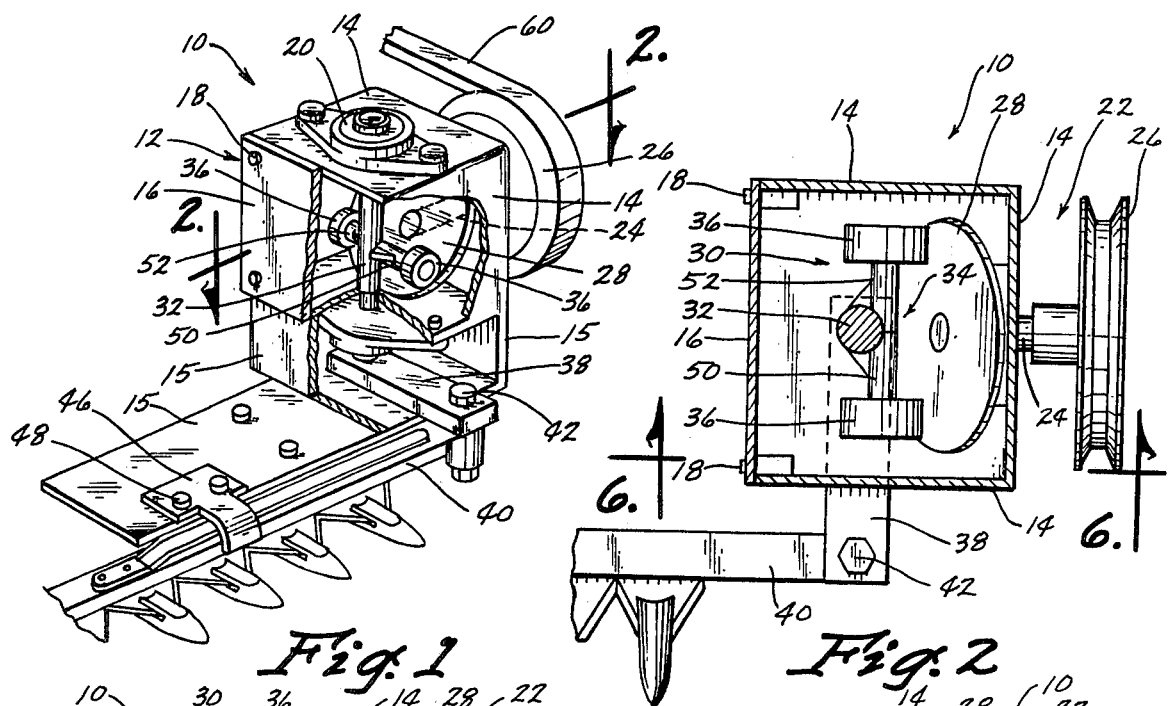
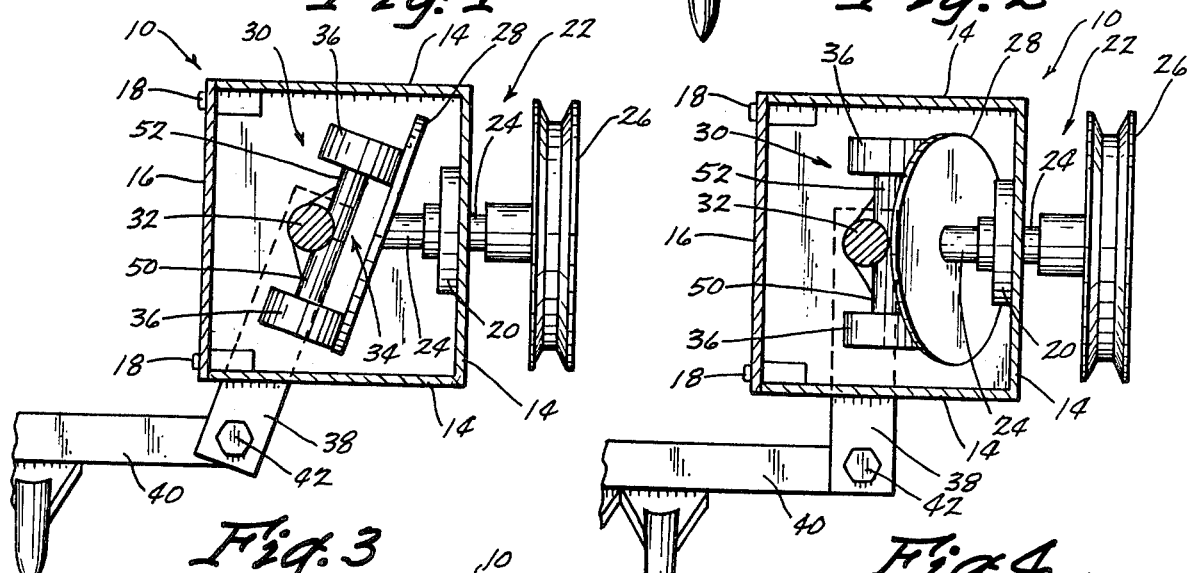
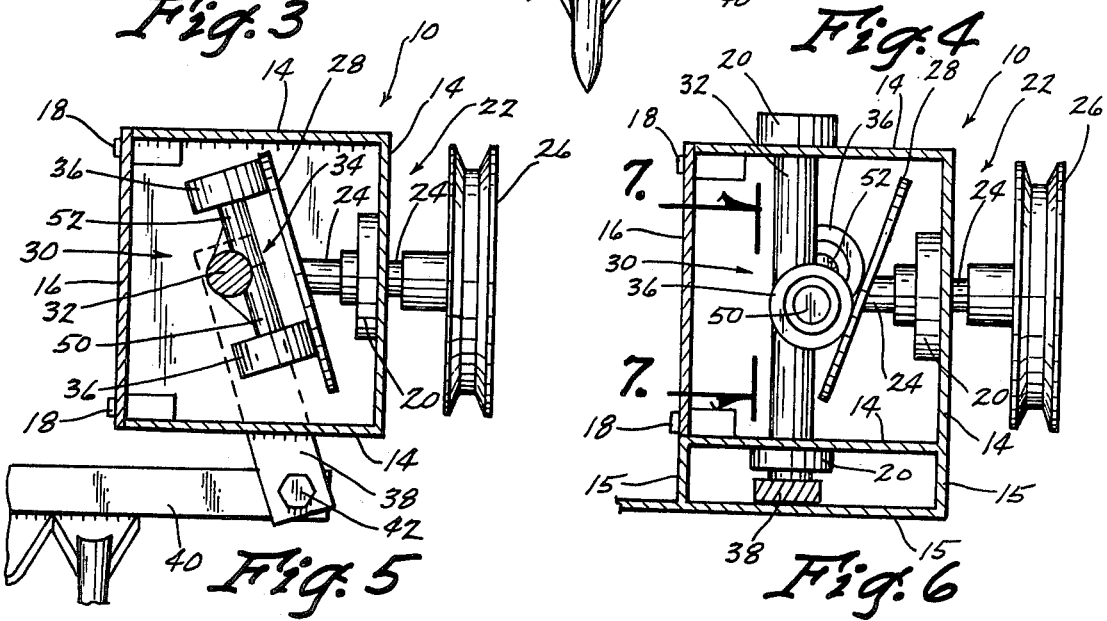

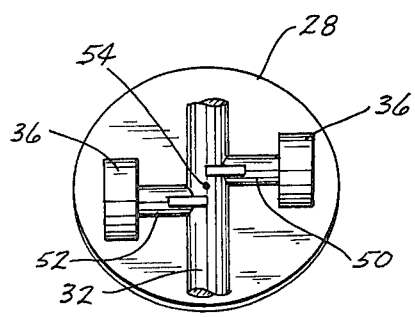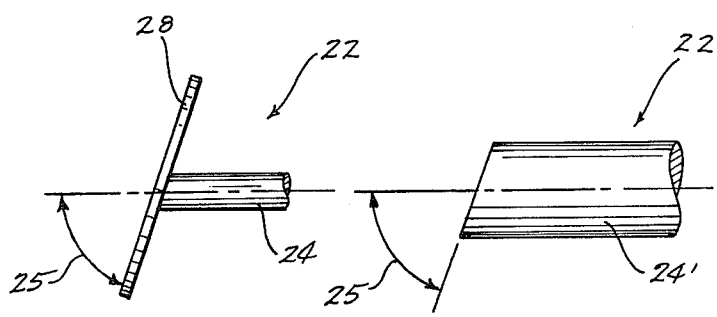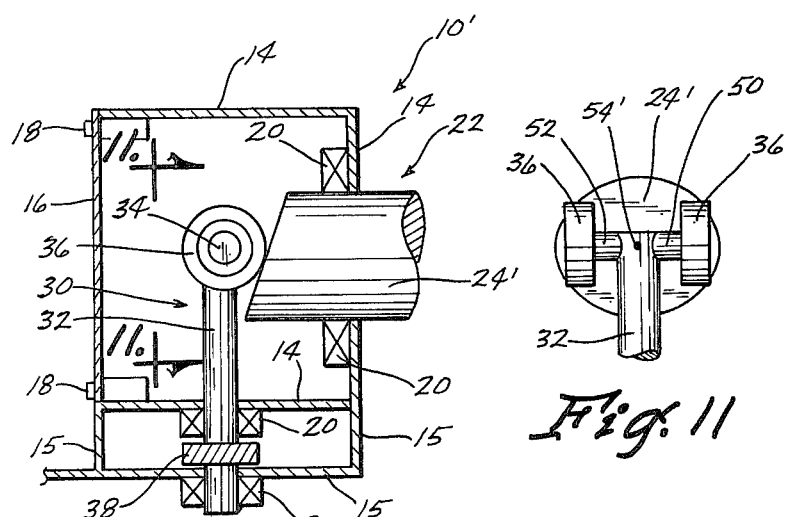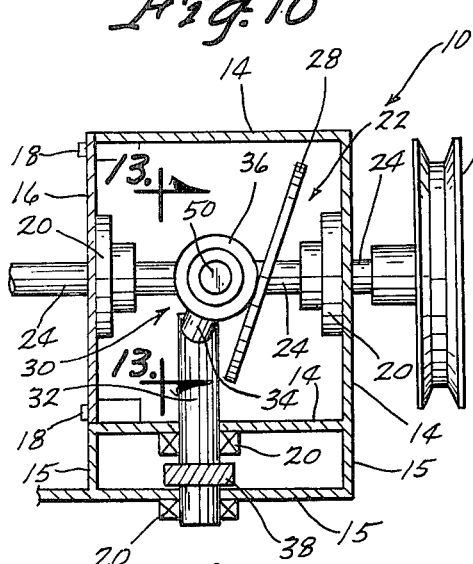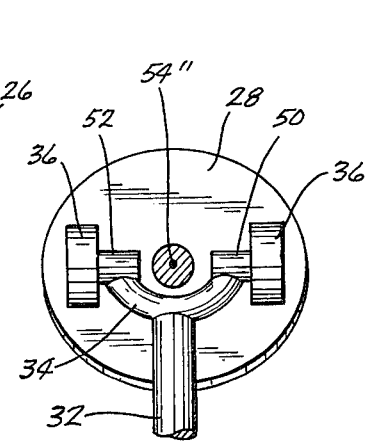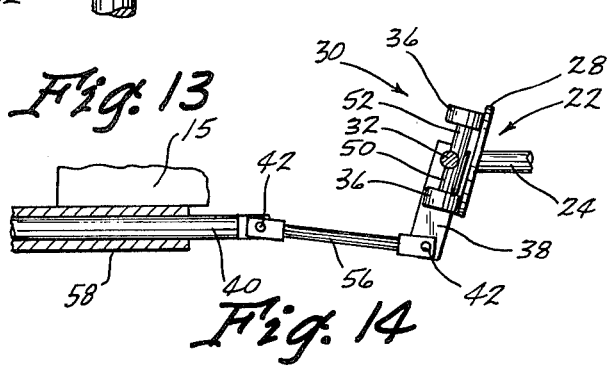

MECHANICAL MOVEMENT MECHANISM

BACKGROUND OF THE INVENTION

The present invention relates generally to a reversible mechanical movement and more particularly to an apparatus wherein rotating motion is converted to oscillating motion, and the reverse, by contacting the surface of a rotatable member and an oscillatory member one to the other. This arrangement eliminates the need for a grooved engagement or a connection between the rotatable member and the oscillatory member and allows high speed operation.

The conversion of oscillating motion to linear reciprocating motion, or the reverse, is accomplished by conventional methods; however, linear reciprocating motion can be utilized as the prime moving motion or can be the resultant motion desired in a particular application.

One of the most critical problems with mechanical movement assemblies, driving or driven by reciprocating elements, is the limited speed of operation. Speeds have been heretofore limited to the range of 450 to 500 strokes per minute. This results in the limitation of the speed and efficiency of machines utilizing the movement.

SUMMARY OF THE INVENTION

The present invention is applicable to many types of machines where it is desirable to operate an oscillating or reciprocating element from a rotary element, or where it is desirable to operate a rotary element from an oscillating or reciprocating element.

The present invention permits such mechanical movement assemblies to achieve and maintain, or utilize, speeds in the range of 1350 to 1400 strokes per minute. This surprising and dramatic increase in speed provides for corresponding increases in efficiency, especially in machines where machine speed is presently limited by the speed of the reciprocating element. The increased operating speed is very important in high cost machines. An excellent example is grain combines, where the ground speed of the combine is limited by the reciprocating speed of the sickle bar.

Because it incorporates relatively few moving elements, the present invention provides a low cost, simple, low maintainance mechanical movement assembly.

An object of the present invention is to provide a mechanical movement assembly, driving or driven by reciprocating elements, for converting rotary motion to oscillating motion, or vice versa, and which is capable of achieving and maintaining high speeds of operation.

Another object is to provide a mechanical movement assembly incorporating relatively few moving parts.

A further object of the invention is the provision of a low cost, simple, low maintainance mechanical movement assembly.

Other objects, advantages and novel features of the present invention will become apparent from the following detailed description of the invention when considered in conjunction with the accompanying drawings.

BRIEF DESCRIPTION OF THE DRAWINGS

FIG. 1 is a cutaway perspective view of the mechanical movement assembly of the present invention;

FIG. 2 is a sectional view of the invention taken along line 2—2 of FIG. 1;

FIG. 3 is identical to FIG. 2 except it depicts a disc rotated 90° from its FIG. 2 position;

FIG. 4 is identical to FIG. 3 except it depicts the disc rotated an additional 90°;

FIG. 5 is identical to FIG. 4 except it depicts the disc rotated yet another 90°;

FIG. 6 is a sectional view of the invention taken along line 6—6 of FIG. 2;

FIG. 7 is a fragmentary side view of the invention taken along line 7—7 of FIG. 6;

FIG. 8 is an isolated view of the contact disc and rotatable shaft integral therewith depicting the oblique angle between the two elements;

FIG. 9 is an isolated view of the rotatable shaft depicting the oblique angle of the end surface;

FIG. 10 is a sectional view comparable to FIG. 6, of an alternate embodiment of the invention;

FIG. 11 is a fragmentary side elevation view taken along line 11—11 of FIG. 10;

FIG. 12 is a sectional view of yet another alternate embodiment of the invention;

FIG. 13 is a side elevational view taken along line 13—13 of FIG. 12; and

FIG. 14 is an isolated view of an alternate connecting means between the oscillatory shaft and the reciprocatory shaft.

DESCRIPTION OF THE PREFERRED EMBODIMENT

Referring now to the drawings wherein like reference numerals designate identical or corresponding parts throughout the several views, FIG. 1 shows the mechanical movement assembly 10 of the present invention.

Assembly 10 is comprised of a stationary casing 12 forming a hollow case and embodying sidewalls 14, and an F shaped frame member 15 extending downwardly and outwardly from the casing 12.

One of the sidewalls 14 forms a removable cover 16 which is secured to the adjacent sidewalls 14 by bolts 18. Standard alignment bearings 20 (FIG. 6) are mounted in sidewalls 14 and are adapted to receive a rotatable unit 22 and an oscillatory unit 30.

The rotatable unit 22 is comprised of a rotatable shaft 24, a pulley 26 rigidly attached to one end of the shaft 24, and a circular contact disc 28 rigidly attached to the other end of said rotatable shaft 24 and disposed at an oblique angle to the longitudinal axis thereof as defined hereinafter. The shaft 24 is received in the bearing 20 intermediate the ends thereof such that the contact disc 28 is disposed interior of the casing 12, and the pulley 26 is disposed exterior to the casing 12.

The oscillatory unit 30 is comprised of an oscillatory shaft 32, a bearing arm 34 rigidly attached intermediate its ends to the oscillatory shaft 32 and disposed essentially perpendicular thereto, and a pair of bearings 36 sleeved over the bearing arm 34 at the opposite ends thereof. The oscillatory shaft 32 is received in alignment bearings 20 near both ends thereof such that the bearing arm is disposed interior of the casing 12 and at least one end of the oscillatory shaft 32 extends exterior to the casing 12.

The rotatable shaft 24 and the oscillatory shaft 32 are disposed essentially perpendicular one to the other as best illustrated in FIGS. 2 and 6. Further, the rotatable unit 22 and the oscillatory unit 30 are aligned such that the contact disc 28 is in contact with the bearings 36 at essentially all times, without need for a grooved engagement or a physical connection between the rotatable member 22 and the oscillatory member 30.

A bar 38 (FIG. 1) is rigidly attached at one end to the exterior end of the oscillatory shaft 32 and extends at right angles therefrom. The bar 38 is pivotally attached at the other end to an elongated, conventional reciprocating shaft 40 by a pin 42. A clamp 46 is attached to frame member 15, as by bolts 48, and slidably engages the reciprocating shaft 40.

FIGS. 1, 6 and 7 clearly show the bearing arm 34 wherein one portion 50 of the bearing arm 34, to one side of the point of attachment of the arm 34 to the oscillatory shaft 32, is offset with respect to the other portion 52 of the bearing arm 34 on the opposite side of the point of attachment. Although offset from each other, the longitudinal axis of the portions 50 and 52 are parallel to each other. This offset arrangement is thought to be superior to the linear, non-offset arrangement shown in FIGS. 11 and 13 where alternate assemblies 10' and 10" are illustrated. In experiments using the linear arrangement, a clicking noise was observed when the assembly was operating at high speed. This clicking noise indicated an impacting of the bearings 36 to the surface of the contact disc 28 which resulted in excessive wear. The offset arrangement has successfully eliminated the impacting of the bearings, and thus has eliminated the excessive wear.

FIG. 7 shows a point of intersection 54 wherein the longitudinal axis of the rotatable shaft 24 intersects the line forming the midpoint between portion 50 and portion 52. Although the assembly 10 is operable absent the above described alignment the operation of the assembly 10 is enhanced by such an alignment.

FIG. 8 shows the oblique angle 25 formed by the surface of the contact disc 28 and the longutudinal axis of the rotatable shaft 24. The oblique angle 25 is an acute angle and it determines the degree of oscillation of the oscillatory shaft 32. The degree of oscillation can be changed by substituting a rotatable member 22 having a different oblique angle 25.

FIGS. 9, 10 and 11 illustrate an embodiment 10' the alternate of assembly 10. Assembly 10' operates on the same principle as assembly 10, but shows a different structure wherein the oscillatory shaft 32 extends through only one sidewall 14 of the casing 12. Alignment of the oscillatory shaft 32 is insured by an additional alignment bearing 20 mounted on the frame member 15. Further, assembly 10' eliminates the contact disc 28. A rotatable shaft 24' is of a larger diameter than shaft 24 and provides a surface area sufficient to mate with bearings 36. The bearings 36 are in contact with one surface end of the rotatable shaft 24', such surface end being machined such that the surface end forms an oblique angle 25 with the longitudinal axis of the rotatable shaft 24', as most clearly shown in FIG. 9. FIG. 11 shows a point of intersection 54' similar to that described in conjunction with FIG. 7. It will be noted that the portions 50 and 52 are not offset, as in the embodiment 10 (FIG. 7), but have a common axis.

FIGS. 12 and 13 illustrate still another alternate assembly 10" wherein the rotatable shaft 24 is journalized on alignment bearings 20 and extends through opposite sidewalls 14 of casing 12. The bearing arm 34 forms a fork arrangement with the oscillatory shaft 32. This fork arrangement permits the rotatable shaft 24 to extend through the casing 12, as described. FIG. 13 shows a point of intersection 54" similar to that described in conjunction with FIGS. 7 and 11. It will be noted that the portions 50 and 52 are not offset, as in embodiment 10 (FIG. 7); but have a common axis.

The embodiments hereinafter described permit a slight transverse motion of the reciprocating shaft 40. A means for preventing such transverse motion of the reciprocatory shaft 40 is illustrated by FIG. 14. One end of the bar 38 is pivotally connected by pin 42 to one end of a connecting rod 56. The opposite end of connecting rod 56 is pivotally connected by pin 42 to one end of the reciprocatory shaft 40. Channel 58 is rigidly attached to frame member 15 and slidable engages the reciprocatory shaft 40 and permits its longitudinal movement while preventing its transverse movement.

The present invention is capable of driving an oscillatory unit 30 or reciprocatory shaft 40 from a rotatable unit 22, or of driving a rotatable unit 22 from an oscillatory unit 30 or reciprocatory shaft 40. The conversion of oscillatory motion to linear reciprocating motion, or the reverse, is accomplished by conventional methods.

When rotary motion is used as the driving motion, the assembly 10 of the present invention is actuated by driving the belt 60 by a rotary power source (not shown). The belt 60 rotates the pulley 26, which rotation is transmitted to the contact disc 28 via the rotatable shaft 24. As the contact disc 28 rotates, it maintains contact with the bearings 36 at essentially all times.

Rotation of the contact disc 28 creates a oscillating movement of the oscillatory member 30 by virtue of the angular relationship of the contact disc 28 to the rotatable shaft 24. This oscillating movement is most clearly shown by FIGS. 2–5. The degree of oscillation about the longitudinal axis of the oscillatory shaft 32 is determined by the oblique angle 25.

The oscillating motion thus produced can be utilized in a particular application or can be further converted to linear reciprocating motion by conventional means. Where linear reciprocating motion is required, the oscillating motion of the oscillatory shaft 32 is converted to the arcing motion of the bar 38 which is rigidly attached at one end to the oscillatory shaft 32. The opposite end of the bar 38 is pivotally attached to the reciprocatory shaft 40 and thus creates a linear reciprocating movement of the reciprocatory shaft 40 by virtue of the arcing motion. The length of the stroke of shaft 40 is determined by both the degree of oscillation, and the distance between the longitudinal axis of the oscillatory shaft 32 and the point of pivotal attachment of the bar 38 and the reciprocatory shaft 40. The length of the stroke can thus be varied by changing the oblique angle 25 or by changing the length of the bar 38 or by changing both.

For example, when the length of the bar 38 is fixed at approximately six inches, and the oblique angle 25 is set at approximately 80° the length of the stroke of shaft 40 will be approximately 2 inches. In the above example, if the oblique angle 25 is set at approximately 73°, the length of the stroke of shaft 40 will be approximately 3½ inches. This range of stroke length, 2 to 3½ inches, is desirable where the mechanical movement assembly 10 is used in conjunction with a sickle bar on a grain combine or the like.

When oscillating motion or linear reciprocating motion is used as the driving motion, the assembly 10 of the present invention is actuated by an oscillating power source (not shown) or a reciprocating power source (not shown) which would be converted to oscillating power by means essentially the reverse of that described above.

Oscillating motion of the power source is transmitted to the bearings 36 on the bearing arm 34 which are in contact with the contact disc 28. The movement of bearings 36 in turn creates a rotary movement of the contact disc 28 by virtue of the angular relationship of the contact disc 28 to the rotatable shaft 24. This rotary movement is shown by FIGS. 2–5. Rotation of the contact disc 28 creates a corresponding rotation of the rotatable shaft 24 and the pulley 26. The rotary motion thus produced can be utilized from the rotatable shaft 24 or the pulley 26 by use of a driven belt 60.

Obviously, many modifications and variations of the present invention are possible in light of the above teachings. It is therefore to be understood that, within the scope of the appended claims, the invention may be practiced otherwise than as specifically described.

I claim:

1. A mechanical movement assembly comprising:
   a frame means;
   rotatable means rotatably attached to said frame means and having a contact face disposed at an oblique angle to the axis of rotation of said rotatable means;
   an oscillatory shaft rotatably attached to said frame means;
   bearing means attached to said oscillatory shaft and oscillated thereby and in contact with said contact face;
   said bearing means including a first bearing arm attached to said oscillatory shaft and spaced in one direction from the longitudinal axis of the oscillatory shaft and a second bearing arm attached to said oscillatory shaft and spaced in an opposite direction from said first bearing arm; and
   said first bearing arm being offset parallel with respect to said second bearing arm and disposed such that the midpoint between the axes of the first and second bearing arms is intersected by the axis of rotation of said rotatable means.

2. The mechanical movement assembly of claim 1 further comprising:
   reciprocatory means attached to said oscillatory shaft, whereby oscillation of said oscillatory shaft results in reciprocation of said reciprocatory means, and reciprocation of said reciprocatory means results in oscillation of said oscillatory shaft.

3. The mechanical movement assembly of claim 1 wherein;
   the axis of rotation of said rotatable means is disposed approximately perpendicular to the longitudinal axis of said oscillatory shaft, the axes of said rotatable means and said oscillatory shaft disposed in a common plane and wherein extension of said axes intersect.

4. The mechanical movement assembly of claim 1 wherein:
   the longitudinal axis of said bearing means is disposed approximately perpendicular to the plane of the longitudinal axis of said oscillatory shaft and the axis of rotation of said rotatable means.

5. The mechanical movement assembly of claim 1 wherein:
   said bearing means is disposed intermediate the longitudinal axis of the oscillatory shaft and the contact face of the rotatable means.

6. The mechanical movement assembly of claim 1 wherein:
   said rotatable means is comprised of a rotatable shaft having said contact face at one end thereof; and
   a pulley attached to the opposite end of said rotatable shaft.

7. The mechanical movement assembly of claim 1 wherein:
   said rotatable means is comprised of a rotatable shaft;
   a contact disc attached on one side to said rotatable shaft and having said contact face formed on an opposite side thereof; and
   a pulley attached to said rotatable shaft.

8. The mechanical movement assembly of claim 1 wherein:
   said bearing means further comprises antifriction bearings sleeved over the first and second bearing arms at the free ends thereof, with the peripheral surface of the antifriction bearings in contact with said contact face of said rotatable means.

9. The mechanical movement assembly of claim 1 wherein:
   said frame means is comprised of a casing, said casing forming a lubricant reservoir and housing for a portion of said rotatable means including said contact face, a portion of said oscillatory shaft, and said bearing means;
   alignment bearings attached to said casing to rotatably receive said rotatable means and said oscillatory shaft; and
   a removable cover attached to said casing.

10. The mechanical movement assembly of claim 2 wherein:
    said reciprocatory means is comprised of a bar attached at one end to said oscillatory shaft and spaced outwardly from the longitudinal axis thereof; and
    a reciprotatory shaft pivotally connected at one end thereof to the opposite end of said bar.

11. The mechanical movement assembly of claim 2 wherein:
    said reciprocatory means is comprised of a bar attached at one end to said oscillatory shaft and spaced outwardly from the longitudinal axis thereof;
    a connecting rod pivotally connected at one end thereof to the opposite end of said bar;
    a reciprocatory shaft pivotally connected at one end thereof to the opposite end of said connecting rod; and
    a channel attached to said frame means and adapted to slidably engage said reciprocatory shaft.

12. The mechanical movement assembly of claim 1 wherein:
    said oblique angle is an acute angle ranging from approximately 73° to approximately 80°.

* * * * *